United States Patent
Lee

(10) Patent No.: US 9,436,232 B2
(45) Date of Patent: Sep. 6, 2016

(54) SMART HOT PLUG RETAINING MECHANISM

(71) Applicant: Brocade Communications Systems, Inc., San Jose, CA (US)

(72) Inventor: Michael K. T. Lee, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 344 days.

(21) Appl. No.: 13/966,650

(22) Filed: Aug. 14, 2013

(65) Prior Publication Data

US 2014/0283370 A1 Sep. 25, 2014

Related U.S. Application Data

(60) Provisional application No. 61/804,549, filed on Mar. 22, 2013.

(51) Int. Cl.
*B23P 19/00* (2006.01)
*H05K 13/04* (2006.01)
*G06F 1/18* (2006.01)

(52) U.S. Cl.
CPC .......... *G06F 1/183* (2013.01); *Y10T 29/49004* (2015.01); *Y10T 29/49826* (2015.01)

(58) Field of Classification Search
CPC .......... G06F 1/16; G06F 1/182; G06F 1/183; Y10T 29/49025; Y10T 29/49826; Y10T 29/49904; Y10T 29/5313; Y10T 29/53165; Y10T 29/53265
USPC ....... 29/428, 453, 469, 525, 603.03, 603.04, 29/603.05; 361/679.02, 685, 724, 726
See application file for complete search history.

(56) References Cited

U.S. PATENT DOCUMENTS

| | | | |
|---|---|---|---|
| 5,530,302 A | 6/1996 | Hamre et al. | |
| 5,600,539 A * | 2/1997 | Heys et al. | ............... 361/679.32 |
| 6,038,892 A * | 3/2000 | Schmitt | .............................. 70/78 |
| 6,182,173 B1 | 1/2001 | Grosser et al. | |
| 6,430,041 B1 * | 8/2002 | Johnson et al. | ......... 361/679.48 |
| 6,671,181 B2 | 12/2003 | Kaminski | |

OTHER PUBLICATIONS

Lee, "Smart Hot-Plug Latch and Protection Method," U.S. Appl. No. 61/804,549, filed Mar. 22, 2013.

* cited by examiner

*Primary Examiner* — Paul D Kim
(74) *Attorney, Agent, or Firm* — Innovation Counsel LLP; Serge J. Hodgson

(57) ABSTRACT

A computer system includes a removable computer module. The computer module includes a retaining mechanism securing the computer module within a computer system chassis of the computer system. The computer module further includes a retaining mechanism protection device preventing access to the retaining mechanism. To remove the computer module from the computer system chassis, a user must move the retaining mechanism protection device. Upon notification of movement of the retaining mechanism protection device, the CPU takes the appropriate operations to disable the functionality of the computer module and allow safe removal thereof without powering down the computer system.

15 Claims, 6 Drawing Sheets

SMART HOT PLUG RETAINING MECHANISM

RELATED APPLICATIONS

This application claims the benefit of U.S. Provisional Application No. 61/804,549 filed on Mar. 22, 2013, entitled "Smart Hot-plug Latch and Protection Method" of Michael Lee, which is incorporated herein by reference in its entirety.

BACKGROUND

1. Field

The present application relates to the field of electronics, and more particularly, to structures and methods for securing modules within a computer system chassis.

2. Description of the Related Art

Computer systems are formed with computer modules, which support various functionality of the computer system. To allow easy repair, upgrade, or other access to the computer modules, computer system chassis are formed with computer module bays into which the computer modules can quickly be inserted and removed.

Traditionally, removal of a computer module involved powering down the computer system, removing and/or replacing the computer module, and then powering the computer system back up. More recently, it has become increasingly important to avoid powering down computer systems.

Accordingly, computer systems are designed to allow removal and/or replacement of computer modules without powering down the computer system. Such replacement is sometimes called "hot plugging" in that the computer module is plugged in and out (inserted and removed) while the computer system is hot (powered up).

It is beneficial to provide the computer system, e.g., the central processing unit (CPU), advanced warning of removal of a computer module. This advanced warning allows the computer system time to take the appropriate operations to ensure smooth operation and avoid corruption upon removal of the computer module. Unfortunately, there is often limited to no advance notice that a computer module is being removed.

SUMMARY

A computer system includes a removable computer module. The computer module includes a retaining mechanism securing the computer module within a computer system chassis of the computer system. The computer module further includes a retaining mechanism protection device preventing access to the retaining mechanism.

To remove the computer module from the computer system chassis, a user must move the retaining mechanism protection device. Upon notification of movement of the retaining mechanism protection device, the CPU takes the appropriate operations to disable the functionality of the computer module and allow safe removal thereof without powering down the computer system.

These and other features in accordance with various embodiments will be more readily apparent from the detailed description set forth below taken in conjunction with the accompanying drawings.

BRIEF DESCRIPTION OF THE DRAWINGS

In the following description, the same or similar elements are labeled with the same or similar reference numbers.

DETAILED DESCRIPTION

Figure 2:
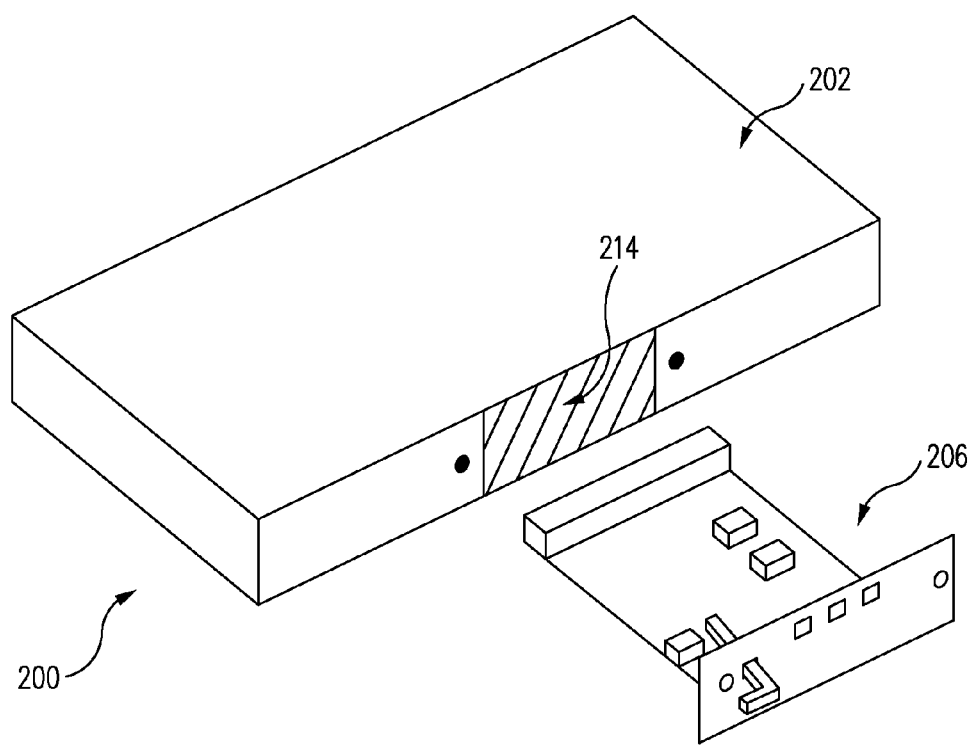
FIG. 2 is a perspective view of a computer system having a module removed in accordance with one embodiment.
Figure 5:
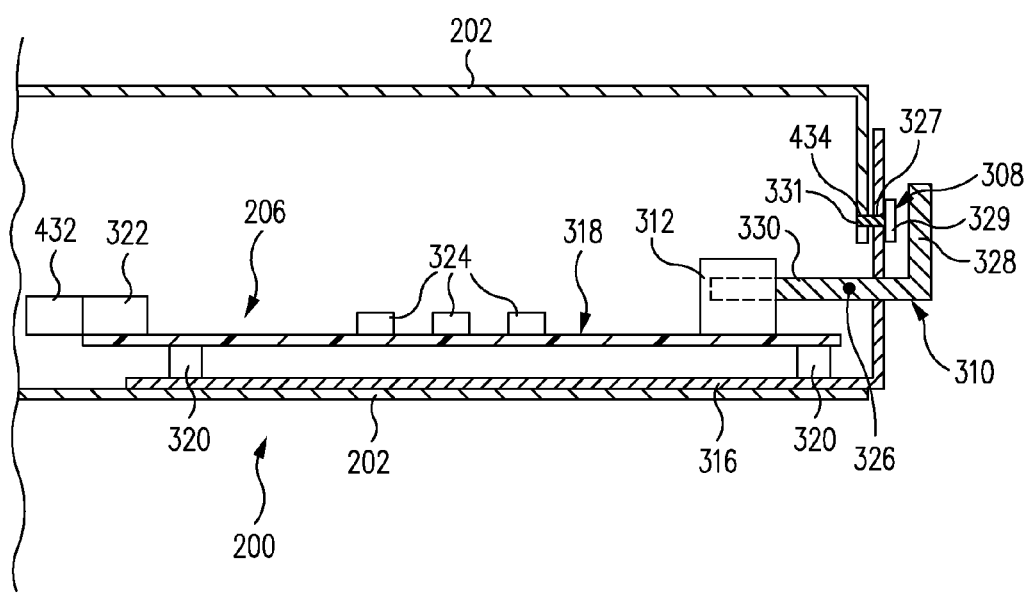
FIG. 5 is a side perspective view of the module installed within the computer system chassis of the computer system of FIG. 2 in accordance with one embodiment.

As an overview and in accordance with one embodiment, referring to FIGS. 2 and 5 together, a computer system 200 includes a removable computer module 206. Computer module 206 includes a retaining mechanism 308 securing computer module 206 within a computer system chassis 202 of computer system 200. Computer module 206 further includes a retaining mechanism protection device 310 preventing access to retaining mechanism 308 as illustrated in FIG. 5.

Figure 4:
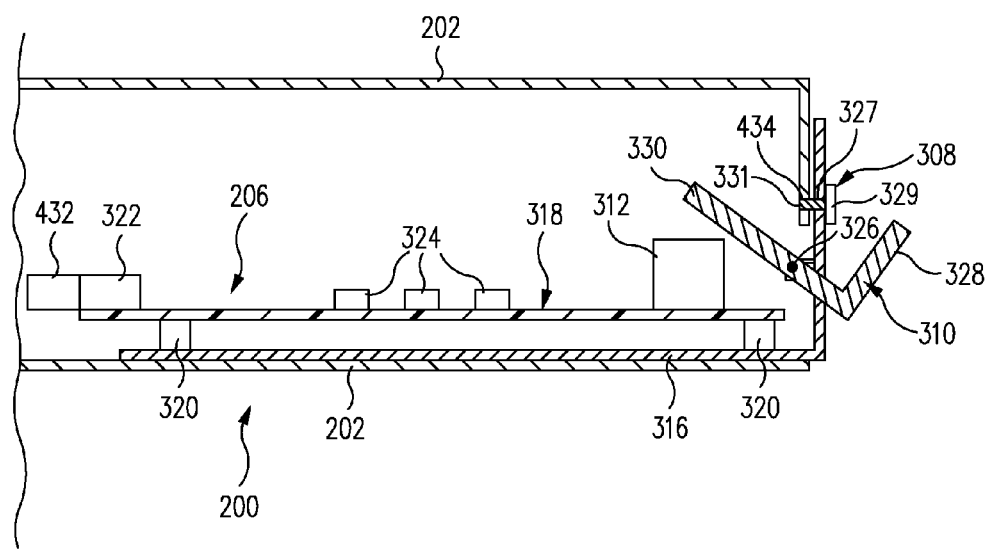
FIG. 4 is a side perspective view of the module located within a computer system chassis of the computer system of FIG. 2 in accordance with one embodiment.

To remove computer module 206 from computer system chassis 202, a user must move retaining mechanism protection device 310 to gain access to retaining mechanism 308 as illustrated in FIG. 4. Upon notification of movement of retaining mechanism protection device 310, the central processing unit (CPU) of computer system 200 takes the appropriate operations to disable the functionality of computer module 206 and allow safe removal thereof without powering down computer system 200.

Figure 1:
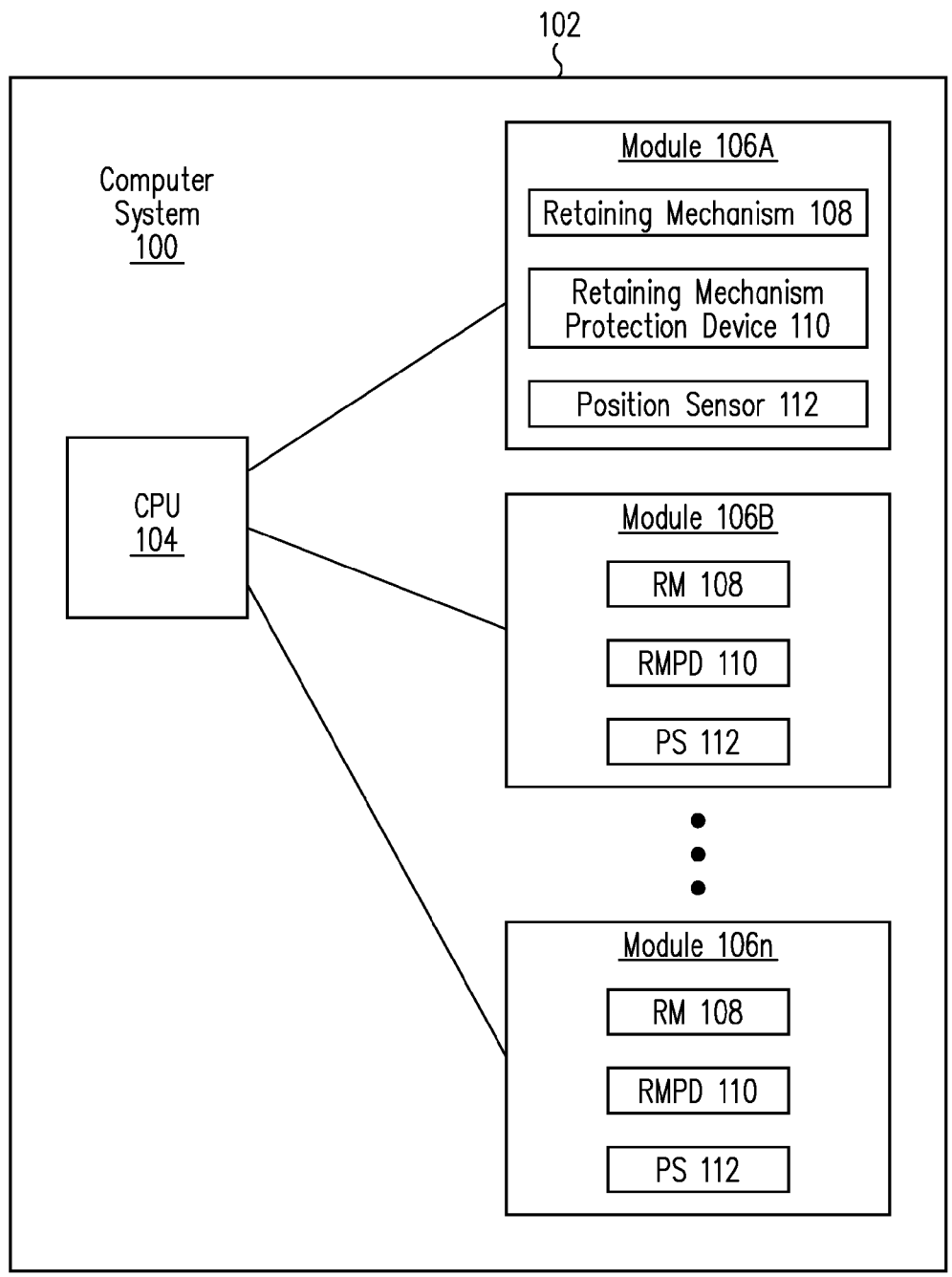
FIG. 1 is a block diagram of a computer system in accordance with one embodiment.

Now in more detail, FIG. 1 is a block diagram of a computer system 100 in accordance with one embodiment. Computer system 100 includes a computer system chassis 102, a central processing unit (CPU) 104 and one or more computer modules 106A, 106B, . . . 106n, collectively modules 106. Modules 106 are sometimes called hot plug modules.

Computer system 100 can further include other components, e.g., power supplies, disk drives, fans, or other components, which are well known to those of skill in the art and so are not described or illustrated to avoid detracting from the principles in accordance with this embodiment. Although a particular computer system 100 is described below, structures and methods in accordance with various embodiments can be applied to any hot-plug system.

As discussed in further detail below, computer system chassis 102 includes one or more computer module bays into which modules 106 are readily inserted and removed.

Referring to a first module 106A of the plurality of modules 106, module 106A includes a retaining mechanism 108, a retaining mechanism protection device 110, and a position sensor 112, e.g., an optical sensor.

Retaining mechanism 108, e.g., a short pin, regular pin, thumbscrew, clasp, latch, and/or other fastener, is a mechanism for retaining module 106A within computer system chassis 102. For example, module 106A is inserted into computer system chassis 102 and then secured therein by retaining mechanism 108.

Retaining mechanism protection device 110 is a device that protects retaining mechanism 108. In one embodiment, retaining mechanism protection device 110 covers retaining mechanism 108 thus preventing accidental contact with retaining mechanism 108.

Retaining mechanism protection device 110 is movable between a protected position and an access position. When in the protected position, retaining mechanism protection device 110 protects retaining mechanism 108. Conversely, when in the access position, retaining mechanism protection device 110 allows access to retaining mechanism 108.

Position sensor 112 senses, e.g., optically, the position of retaining mechanism protection device 110. More particularly, position sensor 112 senses whether retaining mechanism protection device 110 is in the access position, the protected position, and when retaining mechanism protection device 110 moves from the access position to the protected position and vice versa.

Module 106A including position sensor 112 is coupled to CPU 104. Position sensor 112 sends signals to CPU 104 indicating whether retaining mechanism protection device 110 is in the access position, the protected position, and when retaining mechanism protection device 110 moves from the access position to the protected position and vice versa.

For example, module 106A is inserted into computer system chassis 102 with retaining mechanism protection device 110 in the access position. Retaining mechanism 108 is used, e.g., screwed, to secure module 106A to computer system chassis 102.

Retaining mechanism protection device 110 is moved from the access position to the protected position to protect retaining mechanism 108. Movement of retaining mechanism protection device 110 to the protected position is sensed by position sensor 112.

Position sensor 112 informs CPU 104 that module 106A is installed and secured within computer system chassis 102. CPU 104 takes the appropriate operations to utilize the functionality of module 106A.

Conversely, to remove module 106A from computer system chassis 102, retaining mechanism protection device 110 is moved from the protected position to the access position to allow access to retaining mechanism 108. Movement of retaining mechanism protection device 110 to the access position is sensed by position sensor 112. Position sensor 112 informs CPU 104 that module 106A is being removed from computer system chassis 102.

CPU 104 takes the appropriate operations to disable the functionality of module 106A and allow safe removal thereof. In one embodiment, removal of module 106A is called a hot plug event. Early detection of the hot plug event provides for a system design where CPU 104 has time to react to the hot-plug event and provide proper traffic processing before the hot plug event. By allowing CPU 104 to process critical information prior to removal of module 106A, computer system 100 is provided with a high availability system design.

Since retaining mechanism protection device 110 must be moved before retaining mechanism 108 is disengaged from computer system chassis 102, advance notice, e.g., on the order of seconds or more, of removal of module 106A is provided to CPU 104. This advanced notice is sometimes called the reaction time interval as it is the time interval in which CPU 104 has to react to the pending removal of module 106A. This allows CPU 104 adequate time to take appropriate operations to ensure smooth operation and avoid corruption upon removal of the module 106A.

Further, a user is required to move retaining mechanism protection device 110 to the access position to remove module 106A. Thus, a user is not required to remember to take voluntary action to provide advanced notice to CPU 104 that module 106A is being removed. This avoids the user forgetting to take the voluntary action to provide the advanced notice to CPU 104 that module 106A is being removed, and the associated undesirable consequences.

Further still, when in the protected position, retaining mechanism protection device 110 protects retaining mechanism 108. Accordingly, retaining mechanism protection device 110 prevents accidental contact, e.g., bumping, with retaining mechanism 108 and accidental removal of module 106A.

Although module 106A and operation thereof is described in detail above, in light of this disclosure, those of skill in the art will understand that the discussion is equally applicable to the other modules 106B . . . 106n. Further, although computer system 100 is described as including a plurality of modules 106, in one embodiment, computer system 100 includes only a single module 106.

FIG. 2 is a perspective view of a computer system 200 having a module 206, e.g., a module or blade, removed in accordance with one embodiment. Referring now to FIG. 2, computer system 200 includes a computer system chassis 202 having one or more computer module bays 214. Bays 214 are slots or other openings into which modules 206 are inserted and removed. In FIG. 2, an uninstalled module 206 is shown prior to installation into a respective bay 214 of computer system chassis 202.

Figure 3:
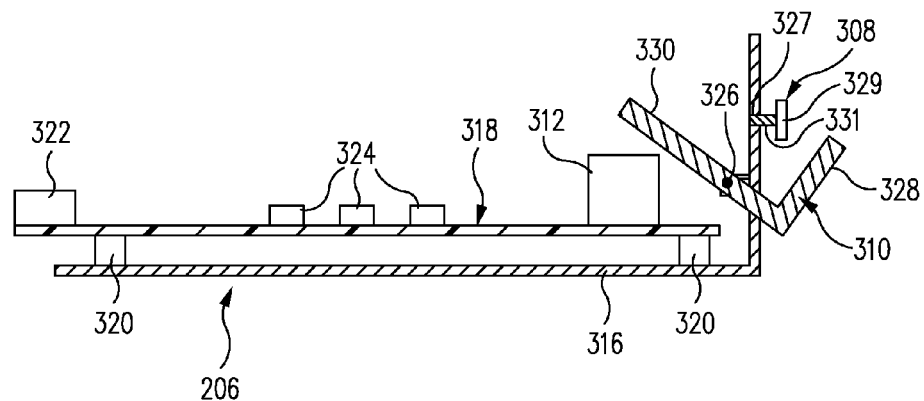
FIG. 3 is a side perspective view of the uninstalled module of FIG. 2 in accordance with one embodiment.

FIG. 3 is a side perspective view of the uninstalled module 206 of FIG. 2 in accordance with one embodiment. Referring now to FIGS. 2 and 3 together, module 206 includes a module housing 316. A printed circuit board assembly (PCBA) 318 is mounted to module housing 316, e.g., by one or more standoffs 320.

Printed circuit board assembly 318 includes a module connector 322, e.g., a backplane or module connector with short pins. Module connector 322 is an input output (I/O) interface that electrically connects module 206 to computer system chassis 202 upon insertion of module 206 into bay 214 of computer system chassis 202 as those of skill in the art will understand in light of this disclosure.

Printed circuit board assembly 318 further includes one or more electronic components 324 which provide the functionality of module 206. Electronic components 324 can be any one of a number of components depending upon the particular application and functionality of module 206 as those of skill in the art will understand in light of this disclosure. Module 206 can have any one or more of a number of functionalities. In one particular embodiment, module 206 is an encryption module that encrypts data into and/or out of computer system 200.

Printed circuit board assembly 318 further includes position sensor 312, e.g., an optical sensor, which senses the position of a retaining mechanism protection device 310 of module 206. Retaining mechanism protection device 310, sometimes called a movement protection mechanism, is pivotally mounted on module housing 316 by a pivot 326.

A retaining mechanism 308, e.g., a thumb screw or thumb screw assembly, is mounted to module housing 316. Module housing 316 includes a retaining mechanism aperture 327 through which retaining mechanism 308 extends. Retaining mechanism 308 is longitudinally moveable, sometimes called slideable, within retaining mechanism aperture 327. Further, a structure to prevent retaining mechanism 308 from falling out of retaining mechanism aperture 327 is provided in one embodiment, e.g., a collar and spring.

In accordance with this particular embodiment, retaining mechanism 308 includes a screw head 329 and a threaded cylinder 331. A user grasps screw head 329 and/or uses a screwdriver or other tool to twist retaining mechanism 308 and thus engage threaded cylinder 331 with computer system chassis 202 as described further below. Threaded cylinder 331 is rotatable around the longitudinal axis of threaded cylinder 331 and slideable along the longitudinal axis of threaded cylinder 331 within retaining mechanism aperture 327.

Retaining mechanism protection device 310 includes a retaining mechanism cover 328 and a position sensor arm 330. Position sensor arm 330 is coupled to pivot 326, e.g., a pin, and thus pivotally coupled to module housing 316.

Retaining mechanism protection device 310 is shown in the access position, sometimes called open position. More particularly, retaining mechanism cover 328 does not cover, i.e., exposes, retaining mechanism 308, e.g., screw head 329. Further, position sensor arm 330 is not within, i.e., is separated from, position sensor 312. In the access position, retaining mechanism protection device 310 allows access to retaining mechanism 308, e.g., screw head 329.

FIG. 4 is a side perspective view of module 206 located within computer system chassis 202 of FIG. 2 in accordance with one embodiment. Referring now to FIGS. 2, 3, and 4 together, module 206 is inserted within bay 214 of computer system chassis 202. This causes module connector 322 of module 206 to electrically connect to a chassis connector 432 of computer system chassis 202.

Further, as illustrated in FIG. 4, retaining mechanism 308 is used to mount module 206 to computer system chassis 202. For example, retaining mechanism 308 is a thumb screw that is screwed, sometimes called threaded, into a threaded aperture 434 of computer system chassis 202 to secure module 206 to computer system chassis 202. In accordance with this particular embodiment, screw head 329 is twisted to thread threaded cylinder 331 into threaded aperture 434 of computer system chassis 202.

As retaining mechanism protection device 310 is in the access position, retaining mechanism 308 is freely accessible allowing the user to screw retaining mechanism 308 into threaded aperture 434 in computer system chassis 202 thus securing module 206 to computer system chassis 202.

Figure 6:
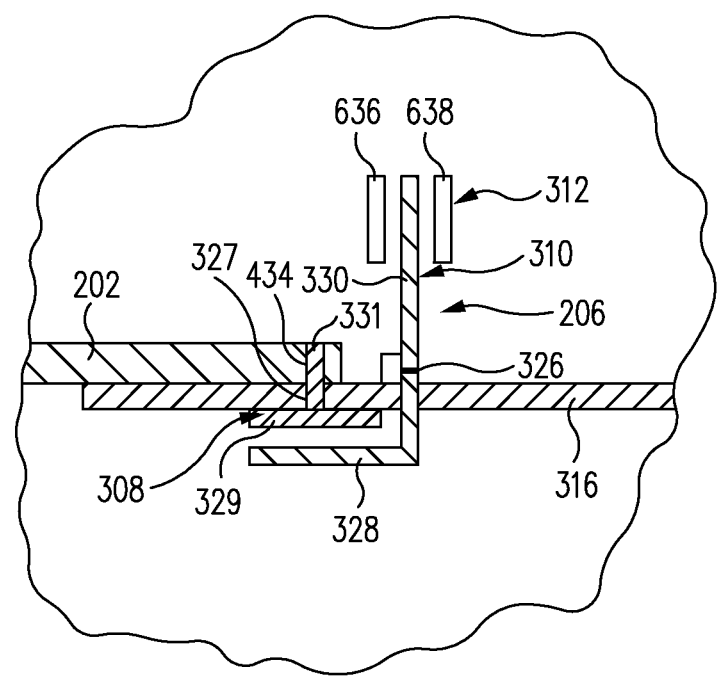
FIG. 6 is a top perspective view of a portion of the module and the computer system chassis of FIG. 5 in accordance with one embodiment.

FIG. 5 is a side perspective view of module 206 installed within computer system chassis 202 of FIG. 2 in accordance with one embodiment. FIG. 6 is a top perspective view of a portion of module 206 and computer system chassis 202 of FIG. 5 in accordance with one embodiment.

Referring now to FIGS. 2, 4, 5, and 6 together, retaining mechanism protection device 310 is pivoted from the access position, sometimes called the open position, as illustrated in FIG. 4 to the protected position, sometimes called the closed position, as illustrated in FIGS. 5 and 6.

Paying particular attention to FIGS. 5 and 6 now, in the protected position, retaining mechanism protection device 310 prevents access to retaining mechanism 308. More particularly, retaining mechanism cover 328 of retaining mechanism protection device 310 covers retaining mechanism 308, e.g., screw head 329, preventing access thereto.

In one embodiment, retaining mechanism cover 328 is a flat plate that is placed over screw head 329 preventing access thereto. In another embodiment, retaining mechanism cover 328 is a cup shaped enclosure that encloses screw head 329 preventing access thereto. In other embodiments, retaining mechanism cover 328 has any one of a number of shapes that block access to screw head 329.

Further, in the protected position, retaining mechanism protection device 310 activates position sensor 312. More particularly, position sensor arm 330 of retaining mechanism protection device 310 is located within or otherwise activates position sensor 312.

For example, position sensor 312 is an optical sensor and includes a light emitter 636 and a light detector 638. Light detector 638 senses light emitted from light emitter 636.

Position sensor arm 330 is located between light emitter 636 and light detector 638 when retaining mechanism protection device 310 is in the protected position and covering retaining mechanism 308. Position sensor arm 330 blocks the light being emitted from light emitter 636. This blockage of light by position sensor arm 330 is detected by light detector 638. In this manner, position sensor 312 detects that retaining mechanism protection device 310 is in the protected position, i.e., prevents access to retaining mechanism 308, and that installation of module 206 within computer system chassis 202 is complete.

In one embodiment, upon detection by position sensor 312 that retaining mechanism protection device 310 is in the protected position, the CPU of computer system 200 utilizes the functionality of module 206.

Conversely, to remove module 206, the user moves retaining mechanism protection device 310 from the protected position as illustrated in FIGS. 5 and 6 to the access position as illustrated in FIG. 4 to allow access to retaining mechanism 308. This moves position sensor arm 330 from between light emitter 636 and light detector 638 when retaining mechanism protection device 310 is in the protected position to be separated from position sensor 312 when in the access position.

Upon removal of position sensor arm 330 from position sensor 312, the light being emitted from light emitter 636 is no longer blocked by position sensor arm 330. Accordingly, the light emitted from light emitter 636 reaches light detector 638. In this manner, position sensor 312 detects that retaining mechanism protection device 310 is in the access position and that module 206 is in the process of being removed from computer system chassis 202.

In one embodiment, upon detection by position sensor 312 that retaining mechanism protection device 310 is in the access position, i.e., that module 206 is being removed, the CPU of computer system 200 takes appropriate operations to ensure safe removal of module 206.

After moving retaining mechanism protection device 310 to the access position, the user removes retaining mechanism 308 from computer system chassis 202, e.g., unscrews retaining mechanism 308 from threaded aperture 434, and then safely removes module 206.

Figure 7:
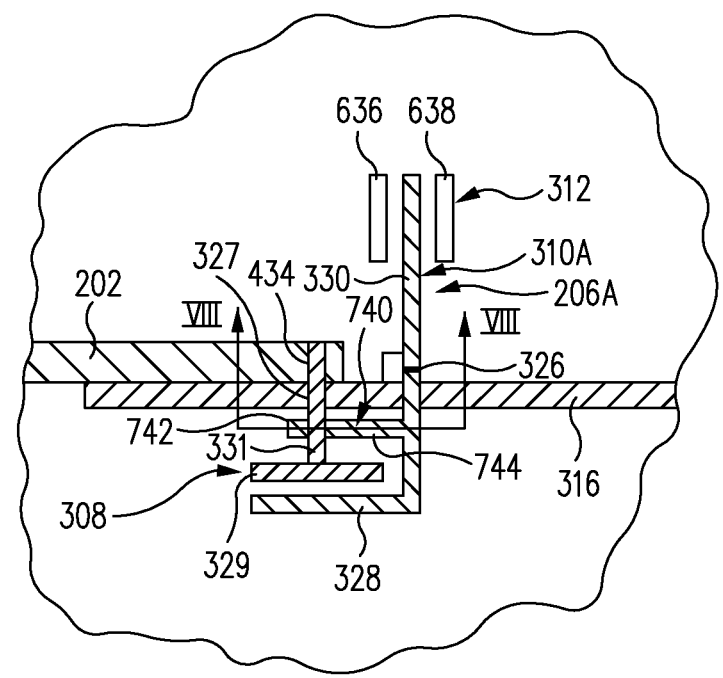
FIG. 7 is a top perspective view of a portion of a module installed within the computer system chassis of FIG. 2 in accordance with another embodiment.
Figure 8:
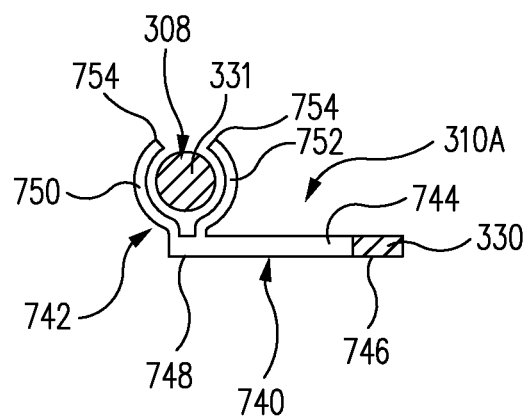
FIG. 8 is a cross-sectional view along the line VIII-VIII of the module of FIG. 7.

FIG. 7 is a top perspective view of a portion of a module 206A installed within computer system chassis 202 of FIG. 2 in accordance with another embodiment. FIG. 8 is a cross-sectional view along the line VIII-VIII of module 206A of FIG. 7. Module 206A of FIGS. 7 and 8 is similar to module 206 of FIGS. 2-6 and only the significant differences are described below.

Referring now to FIGS. 7 and 8 together, a retaining mechanism protection device 310A of module 206A includes a catch 740. Catch 740 engages (catches) threaded cylinder 331 of retaining mechanism 308 when retaining mechanism protection device 310A is in the protected position and protecting retaining mechanism 308.

A stop or other feature is provided to insure that a portion of threaded cylinder 331 is exposed between screw head 329 and module housing 316. This allows catch 740 to engage and disengage the exposed portion of threaded cylinder 331 as described below.

Catch 740 prevents accidental movement of retaining mechanism protection device 310A from the protected position to the access position. For example, catch 740 prevents unintentional movement of retaining mechanism protection device 310A due to shock and vibration.

In the particular embodiment illustrated in FIGS. 7-8, catch 740 includes a clasp 742 and a catch arm 744. Catch arm 744 extends at a first end 746 from position sensor arm 330 to second end 748 at a position aligned with, e.g., below in the view of FIG. 8, threaded cylinder 331 of retaining mechanism 308.

Clasp 742 extends from catch arm 744, e.g., at second end 748. Clasp 742 is a resilient member that expands around threaded cylinder 331 upon application of force and then snaps around threaded cylinder 331 as retaining mechanism protection device 310A is moved from the access position to the protected position.

More particularly, clasp 742 includes first and second clasp members 750, 752, sometimes called clasp springs. First ends 754 of clasp member 750, 752 are forced against threaded cylinder 331 during movement of retaining mechanism protection device 310A from the protected position to the access position (upward in the view of FIG. 8) causing clasp members 750, 752 to be forced apart from one another by threaded cylinder 331. As first ends 754 of clasp member 750, 752 pass around the thickness of threaded cylinder 331, first ends 754 move back towards one another and around threaded cylinder 331. In accordance with this embodiment, clasp member 750, 752 are curved to approximately match the outer cylindrical surface of threaded cylinder 331.

Clasp 742 expands around threaded cylinder 331 upon application of force and disengages threaded cylinder 331 as retaining mechanism protection device 310A is moved from the protected position to the access position (downward in the view of FIG. 8) in the opposite manner as that described above regarding engagement of clasp 742 to threaded cylinder 331.

The drawings and the forgoing description gave examples of embodiments in accordance with the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A structure for securing modules within a computer system chassis comprising:
   a computer module comprising:
   a retaining, mechanism comprising a thumb screw;
   a retaining mechanism protection device moveable between an access position and a protected position, wherein when the retaining mechanism protection device is in the access position, the retaining mechanism protection device exposes the retaining mechanism and when the retaining mechanism protection device is in the protected position, the retaining mechanism protection device covers the retaining mechanism; and
   a position sensor comprising an optical sensor for determining whether the retaining mechanism protection device is in the access position or the protected position, wherein the retaining mechanism protection device comprises a retaining mechanism cover that covers the retaining mechanism when the retaining mechanism protection device is in the protected position.

2. The structure of claim 1 wherein the computer module comprises a module housing, the structure further comprising a pivot pivotally coupling the retaining mechanism protection device to the module housing.

3. The structure of claim 2 wherein the retaining mechanism protection device comprises a position sensor arm coupled to the pivot.

4. The structure of claim 2 wherein the module housing comprises a retaining mechanism aperture through which the retaining mechanism extends.

5. The structure of claim 4 wherein the retaining mechanism is rotatable within the retaining mechanism aperture.

6. The structure of claim 4 wherein the retaining mechanism is slideable within the retaining mechanism aperture.

7. A structure for securing modules within a computer system chassis comprising:
   a computer module comprising:
   a retaining mechanism comprising a thumb screw;
   a retaining mechanism protection device moveable between an access position and a protected position, wherein when the retaining mechanism protection device is in the access position, the retaining mechanism protection device exposes the retaining mechanism and when the retaining mechanism protection device is in the protected position, the retaining mechanism protection device covers the retaining mechanism, wherein the retaining mechanism protection device comprises a position sensor arm;
   a position sensor rising an optical sensor for determining whether the retaining mechanism protection device is in the access position or the protected position, wherein the position sensor arm activates the position sensor when the retaining mechanism protection device is in the protected position.

8. The structure of claim 7 wherein the optical sensor comprises:
   a light emitter; and
   a light detector.

9. The structure of claim 8 wherein the position sensor arm blocks light emitted from the light emitter from being received by the light detector when the retaining mechanism protection device is in the protected position.

10. A structure for securing modules within a computer system chassis comprising:
    a computer system chassis;
    a computer module;
    a retaining mechanism securing the computer module to the computer system chassis;
    a retaining mechanism protection device preventing access to the retaining mechanism, the retaining mechanism protection device comprising a catch engaged with the retaining mechanism;
    a position sensor detecting that access to the retaining mechanism is prevented by the retaining mechanism protection device;
    a central processing unit (CPU) coupled to the position sensor.

11. The structure of claim 10 wherein the computer module is located within a computer module bay of the computer system chassis.

12. The structure of claim 10 wherein the computer module comprises a module connector electrically connected to a chassis connector of the computer system chassis.

13. The structure of claim 10 wherein the retaining mechanism is a thumb screw that is threaded into a threaded aperture of the computer system chassis to secure the computer module to the computer system chassis.

14. The structure of claim 10 wherein the CPU utilizes the functionality of the computer module.

15. The structure of claim 10 further comprising a pivot coupling the retaining mechanism protection device to a module housing of the computer module.

* * * * *